United States Patent [19]
Every

[11] 3,761,136
[45] Sept. 25, 1973

[54] METHOD OF TRANSPORTING SULFUR BY PIPELINE
[75] Inventor: Richard L. Every, Ponca City, Okla.
[73] Assignee: Continental Oil Company, Ponca City, Okla.
[22] Filed: Jan. 5, 1971
[21] Appl. No.: 104,179

[52] U.S. Cl. .............. 302/66, 23/308 S, 423/567, 264/13, 302/14
[51] Int. Cl. ..................... C01b 17/10, C01b 17/12
[58] Field of Search .................. 302/66, 14, 15, 16; 23/312 S, 308 S, 229, 313, 312 AM; 423/567; 264/13, 14

[56] References Cited
UNITED STATES PATENTS

| | | | |
|---|---|---|---|
| 1,731,563 | 10/1929 | Crowley | 23/308 S |
| 3,539,225 | 10/1970 | Vondrak | 302/66 |
| 3,547,495 | 12/1970 | Cheney | 302/66 |
| 3,206,256 | 9/1965 | Scott | 302/66 |
| 3,532,389 | 10/1970 | Thompson | 302/66 |
| 3,443,837 | 5/1969 | Meyer | 302/66 |
| 2,947,578 | 8/1960 | Corneil | 302/66 |
| 3,637,351 | 1/1972 | Young | 23/308 S |
| 3,312,506 | 4/1967 | Baker | 302/66 |
| 2,610,899 | 9/1952 | Cross | 302/66 |
| 3,476,441 | 11/1969 | Elliott | 302/66 |

FOREIGN PATENTS OR APPLICATIONS

| | | | |
|---|---|---|---|
| 1,010,904 | 11/1965 | Great Britain | 23/308 S |

Primary Examiner—Norman Yudkoff
Assistant Examiner—S. J. Emery
Attorney—Joseph C. Kotarski, Henry H. Huth, Robert B. Coleman, Jr., Carl Palmer, Kemon, Palmer & Estabrook and Robert S. Nishbett

[57] ABSTRACT

The present invention relates to a method of transporting sulfur by pipeline with a minimum of sulfur precipitation and adherence to the internal parts of the pipeline system. By the present invention, the sulfur to be transported is formed into prills thereby reducing the static electricity charge accumulation capacity of the sulfur. The prills of sulfur are then formed into a pumpable slurry in a carrier liquid and the slurry is pumped through the pipeline.

6 Claims, No Drawings 3,761,136

METHOD OF TRANSPORTING SULFUR BY PIPELINE

BACKGROUND OF THE INVENTION

1. Field of the Invention

The present invention relates generally to a method of transporting sulfur by a pipeline, and more particularly, but not by way of limitation, to the transport of sulfur through a pipeline in the form of a pumpable slurry.

2. Description of the Prior Art

It has been proposed to transport sulfur between locations separated by substantial distances by pipeline. Specifically, the formation of a pumpable slurry which may be pumped through a pipeline linking two locations has been proposed. Such pipeline transport is used to move sulfur as well as the carrier liquid from sites where the sulfur is produced or stock piled and the carrier liquid is available from refineries or other processing plants. However, a continuing problem encountered in the transport of sulfur slurries by pipeline has been the propensity of the sulfur to precipitate and adhere to the internal parts of the pipeline system, particularly valves and fittings. This precipitation of plating out seriously reduces the operational efficiency of the pipeline system requiring increased maintenance, and causes contamination of the pipeline to a degree which presents serious problems if it is desired to use the same pipeline for transporting other materials in a relatively high state of purity.

The present invention provides an improved method of transporting sulfur by pipeline wherein a minimum of precipitation and adherence of the sulfur to the internal parts of the pipeline system is encountered.

SUMMARY OF THE INVENTION

The present invention relates to a method of transporting sulfur by pipeline with a minimum of sulfur precipitation and adherence to the internal parts of the pipeline comprising forming a pumpable slurry of prills of sulfur, and pumping the slurry through the pipeline.

It is, therefore, a general object of the present invention to provide a method of transporting sulfur by pipeline.

A further object of the present invention is the provision of a method of transporting sulfur by pipeline whereby a minimum quantity of sulfur precipitates and adheres to the internal parts of the pipeline system.

Yet a further object of the present invention is the provision of a method of transporting sulfur by pipeline wherein a pumpable sulfur slurry is formed having superior handling characteristics.

Other and further objects will become apparent from the following detailed description of the invention.

DESCRIPTION OF THE PREFERRED EMBODIMENT

Broadly described, the method of the invention comprises prilling the sulfur to be transported to form substantially spherical sulfur pellets having an average size which, in general, does not exceed 2.5 inches in diameter. The sulfur pellets are then introduced to a suitable carrier liquid to form a slurry having a sufficiently low viscosity such that the material can be pumped through a pipeline without difficulty. The carrier liquid is a liquid in which the sulfur is insoluble, or at least not soluble to a degree exceeding 5 weight percent. After formation of the slurry, it can be pumped through a pipeline over substantial distances without the occurrence of sulfur precipitation or adherence to the internal parts of the pipeline to an unacceptable degree.

The present invention is based on the discovery that the tendency of sulfur to precipitate or plate out while being transported through a pipeline in slurry form is largely caused by the static electricity charge accumulated by the sulfur, and that the accumulation of static electricity charge by the sulfur can be lowered by forming the sulfur into prills or pellets. The prills of sulfur present a much smaller surface area for static electricity charge buildup than heretofore transported powdered sulfur or finely divided sulfur particles. Further, a hard crust is formed on the outside of the prills. This hard crust is partially composed of the sulfur $\mu$ amorphous allotropic form which further reduces the tendency of the sulfur to be deposited upon surfaces contacted during movement through a pipeline.

In a specific, though non-limiting aspect of the invention, the prilling of the sulfur is accomplished by heating the sulfur to form a molten stream thereof, forcing the stream of molten sulfur through a plurality of nozzles or orifices to form prills of the sulfur and injecting the molten prills directly into a suitable unreactive fluid such as water or alcohol, or mixtures thereof, thereby rapidly cooling the prills as they are formed. Natural thickening agents may be added to the cooling fluid to increase the viscosity of the fluid and to facilitate the formation of prills or pellets of the desired characteristics. The rapid cooling of the molten sulfur after passing through the prilling orifices causes a relatively hard outside surface crust partially composed of the sulfur $\mu$ amorphous allotropic form to be formed on the prills. As will be understood, sulfur is usually found in its crystalline allotropic form. Upon prilling the sulfur in the manner described above, a portion of the sulfur is converted to its amorphous allotropic form known in the art as sulfur $\mu$. It is known that sulfur $\mu$ has a lesser tendency to be deposited upon surfaces contacted during movement through a pipeline as compared to the tendency of crystalline sulfur to be so deposited. For example, see U.S. Letters Pat. No. 3,339,985 assigned to the assignee of this application. Thus, the formation of sulfur $\mu$ on the outside surfaces of the prills is advantageous.

In forming the prills, the sulfur is melted and heated to a temperature of from about 238° F to about 320° F. Below 238° F the sulfur remains in solid form, and above 320° F it becomes highly viscous and will not prill. However, it has been found that if the sulfur is initially heated to from about 500° F to about 600° F and then cooled to about 300° F before prilling, the prills will form much better than if the sulfur is heated only to 300° F.

As the molten prills are injected into the unreactive cooling fluid, which is preferably maintained at a temperature below about 120° F, they are rapidly cooled and solidified causing a hard crust to be formed on the prills. The sulfur prills are then removed from the cooling fluid in any suitable manner such as filtration and then placed into the carrier liquid to form a pumpable slurry. If the carrier fluid to be used is unreactive to the molten prills, they may be injected directly into the carrier fluid and the step of injecting the prills into a cooling fluid omitted.

As will be understood, the handling characteristics of the slurry formed from the above described sulfur prills and the carrier fluid selected can be varied by varying the size of the prills and the viscosity of the slurry. Te prills may be as large as 2.5 inches in diameter and as small as 0.003 inches in diameter. However, the prills are preferably formed of an average diameter of from about 0.006 inches to about 0.25 inches.

The only significant limitation on the viscosity of the slurry used for transporting the sulfur is that it be sufficiently low to be pumpable. It is preferable, however, to assure ease of movement through the pipeline, that the horsepower requirements to pump the slurry through the pipeline not exceed 1.8 times the horsepower requirement to move the pure liquid carrier through the pipeline.

The type of liquid carrier employed is not particularly critical, but should be a non-solvent for sulfur, or at least dissolve the sulfur to no greater extent than 5 percent by weight. Transporting the sulfur in slurry form is advantageous in that the liquid carrier may be a material which it is desirable to move from the origination of the sulfur shipment to the destination point. Since petroleum derivatives are frequently available near the sulfur deposits, particularly in the United States, preferred carrier materials include, but are not limited to such petroleum derived liquids as crude oils, sour crude oil condensates, crude oil distillates, kerosene and benzene.

In order to reduce the rate at which the prills of sulfur settle or gravitate through the liquid carrier while moving through the pipeline, the density of the sulfur prills may be adjusted to approach the density of the carrier liquid selected. As is well understood by those skilled in the art, the more nearly the density of the solid approaches the density of the liquid, the less tendency the solid will have to settle or gravitate through the liquid and accumulate in low areas along the pipeline. Solid sulfur exhibits a density or specific gravity of approximately 2, water has a specific gravity of 1, and the specific gravities of hydrocarbons range from about 0.5 to about 0.9.

In one embodiment of the present invention, the density matching of the sulfur prills with the carrier liquid is accomplished by incorporating into the solid sulfur prills void spaces containing entrapped air or steam. The preferred technique for entrapping air or steam in the sulfur prills is to inject or mix the air or steam with the molten sulfur stream prior to forming prills thereof. This can be easily accomplished by injecting air or steam into the stream of molten sulfur just prior to forcing it through the prilling orifices. Another technique which may be employed in the present invention is to add foaming or blowing agents to the sulfur prior to melting and heating it. Upon melting and heating the sulfur, gas is released by blowing agents mixed therewith and entrapped in voids created within the molten sulfur. Upon prilling, the sulfur pellets formed exhibit a density more nearly approaching the density of the carrier fluid. Examples of commercially available blowing agents which may be employed in the present invention are $p,p'$ oxybis benzene-sulfonyl hydrazide, asodicarbonamide, p-toluene sulfonyl semicarbazide and p-toluene sulfonyl hydrazide.

The addition of water or steam to the sulfur prills, in addition to reducing the density thereof, reduces the static electricity accumulation capacity of the sulfur prills. A preferred technique for density matching the sulfur prills with the carrier liquid and at the same time reducing the static electricity charge capacity of the prills is to add steam or water to the molten sulfur so that the resultant sulfur prills include water up to 20 percent by weight. In addition, commercially available anti-static electricity compounds may be added to the sulfur-carrier liquid slurry to further reduce the static electricity charge capacity of the sulfur.

The invention can be better understood by referring to the following examples of its practice.

EXAMPLE 1

Laboratory tests were made which illustrate the improved results achieved by the method of the present invention.

Various sulfur slurries were tested for plate-out by placing 400 ml samples thereof in a 500 ml glass beaker fitted with a stopper and a water cooled glass condenser to prevent liquid boil-off. For each test, a three-eighths inch stainless steel tube formed into a U-shape was immersed in the slurry contained in the test beaker and tap water at a temperature of approximately 65° F was continuously circulated through the tube. The slurries tested were continuously mechanically agitated and maintained at a temperature of 130° F for periods of 16 hours each. At the end of each test, the U-shaped steel tube was removed from the beaker, and the thickness of sulfur plated out on the tube determined. The results of these tests are given in Table I below.

TABLE I

SULFUR PLATE-OUT FOR VARIOUS SULFUR-CARRYING FLUID SLURRIES

| Carrying Fluid | Weight Percent Sulfur in Carrying Fluid | Sulfur Form | Average thickness of sulfur plated-out (inches) |
|---|---|---|---|
| Hydrocarbon condensate[1] | 45 | Powder | 1/8 to 3/16 |
| Hydrocarbon condensate | 45 | Prills[2] | 1/16 to 1/8 |
| Kerosene | 45 | Powder | 1/8 to 1/4 |
| Kerosene | 45 | Prills[2] | 1/16 to 1/8 |

[1] Condensate initially contained 0.29 weight percent sulfur.
[2] Melted sulfur was heated to a temperature of approximately 500°F, then cooled to a temperature of approximately 300°F, and then injected into cooling water to form the prills.

From the above data, it may be seen that the method of the present invention results in less sulfur plate-out as compared to powered sulfur-carrying fluid slurries.

EXAMPLE 2

A slurry comprising 40 parts by weight sulfur prills of an average diameter of 0.125 inches and 60 parts by weight kerosene is pumped through a 4 inch pipeline over a distance of 10 miles using a centrifugal pump driven by a 25-horsepower electric motor. Upon completion of the run, and subsequent clean-up of the pipeline, valves and pumps, a second slurry comprising 40 parts by weight of powdered crystalline sulfur and 60 parts by weight kerosene is pumped through the pipeline at the same rate.

The total sulfur content of the two slurries arriving at the pipeline destination are compared and it is determined that about 3 weight percent of the sulfur prills is left in the pipeline as a result of precipitation and adherence thereto, whereas about 21 weight percent of the crystalline sulfur precipitates in the pipeline.

From the foregoing description of the invention, it will have become apparent that an improved method for transporting sulfur by pipeline is provided. Lower sulfur losses in the pipeline result from the use of the method, and in addition, pipeline maintenance is decreased.

Although certain specific embodiments of the invention have been described as exemplary of its practice, these examples are not intended to limit the invention in any way. Other process parameters and materials may be used in accordance with the broad principles outlined herein, and when so used are deemed to be circumscribed by the spirit and scope of the invention except as necessarily limited by the appended claims or reasonable equivalents thereof.

What is claimed is:

1. A method of transporting sulfur by pipeline with a minimum of sulfur precipitation and adherence to internal parts of the pipeline, comprising: heating said sulfur to form a molten stream thereof, said molten sulfur being initially heated to a temperature of from about 500° to about 600° F.; then cooling said molten sulfur to a temperature of from about 238° to 320° F.; forcing said stream of molten sulfur through an orifice to form prills thereof having an average particle diameter of from about 0.003 inches to about 2.5 inches; injecting said directly into a suitable unreactive cooling liquid having a temperature which is maintained below about 125° F so that said prills are rapidly cooled and solidified; separating said prills from said cooling liquid; injecting said prills into a carrier liquid so that a pumpable slurry of said prills and said carrier fluid is formed; and pumping said slurry through said pipeline.

2. A method of claim 1 which is characterized by the step of adjusting the density of said prills of sulfur to approach the density of the carrier liquid by injecting gas selected from the group consisting of air, steam, $p_1p'$ oxybisbenzene-sulfonyl hydrazide, asodicarbonamide, $p$-toluene sulfonyl semicarbazide and $p$-toluene sulfonyl hydrazide into said molten sulfur prior to forcing it through said orifice and forming said prills.

3. A method of claim 2 which is characterized by the step of reducing the static electricity charge accumulation capacity of said prills by adding water as an antistatic electricity agent.

4. The method of claim 1 wherein said carrier liquid is selected from the group consisting of water, sour crude oil condensates, kerosene, benzene, sour condensate and sweet condensate.

5. The method of claim 1 wherein said unreactive cooling liquid is selected from the group consisting of alcohol, water, and mixtures of alcohol and water.

6. The method of claim 1 wherein said carrier fluid is selected from the group consisting of water, sour crude oil condensates, kerosene, benzene, sour condensate and sweet condensate.

* * * * *